United States Patent
Hamamoto et al.

(10) Patent No.: US 6,927,001 B1
(45) Date of Patent: *Aug. 9, 2005

(54) NON-AQUEOUS ELECTROLYTIC SOLUTION AND LITHIUM SECONDARY BATTERY

(75) Inventors: Toshikazu Hamamoto, Ube (JP); Akira Ueki, Ube (JP); Koji Abe, Ube (JP); Yasuo Matsumori, Ube (JP)

(73) Assignee: Ube Industries, Ltd., Yamaguchi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 89 days.

(21) Appl. No.: 09/577,470

(22) Filed: May 24, 2000

(30) Foreign Application Priority Data

May 24, 1999 (JP) ............................................. 11-143222
Apr. 18, 2000 (JP) ....................................... 2000-116327

(51) Int. Cl.$^7$ ............................................... H01M 6/16
(52) U.S. Cl. ........................ 429/332; 429/331; 429/326; 429/324; 252/62.2
(58) Field of Search .................................. 429/307, 306, 429/330, 331, 332, 326, 342, 327, 205, 338, 336; 252/62.2

(56) References Cited

U.S. PATENT DOCUMENTS

| | | | | |
|---|---|---|---|---|
| 5,342,711 A | * | 8/1994 | Tamura et al. | 429/197 |
| 5,776,637 A | * | 7/1998 | Kashio et al. | 429/217 |
| 5,989,744 A | * | 11/1999 | Yamaura | 429/223 |
| 6,139,991 A | * | 10/2000 | Hamamoto et al. | 429/307 |
| 6,156,459 A | * | 12/2000 | Negoro et al. | 429/322 |

* cited by examiner

Primary Examiner—Raymond Alejandro
(74) Attorney, Agent, or Firm—Reed Smith LLP

(57) ABSTRACT

A non-aqueous electrolytic solution composed of two or more organic compounds dissolved in a solvent composed of a cyclic carbonate and a chain carbonate, in an amount of 0.01 to 8 weight % for each compound, in which both of the two organic compounds have a reduction potential higher than those of the cyclic and chain carbonates, and in which one of the organic compounds has a reduction potential equal to that of another organic compound or has a reduction potential lower or higher than that of another organic compound by a potential of less than 0.4 V is favorably employable for a non-aqueous secondary battery.

13 Claims, No Drawings

NON-AQUEOUS ELECTROLYTIC SOLUTION AND LITHIUM SECONDARY BATTERY

FIELD OF THE INVENTION

The present invention relates to a non-aqueous electrolytic solution favorably employable for a non-aqueous lithium secondary battery.

BACKGROUND OF THE INVENTION

At present, a non-aqueous secondary battery such as a lithium secondary battery (particularly, lithium ion secondary battery) is generally employed as an electric source for driving a small electronic device. The non-aqueous secondary battery comprises a positive electrode, a non-aqueous electrolytic solution, and a negative electrode. The non-aqueous lithium ion secondary battery preferably comprises a positive electrode of lithium complex oxide such as $LiCoO_2$, $LiMn_2O_4$, or $LiNiO_2$, a non-aqueous electrolytic solution such as a solution of electrolyte in a carbonate solvent such as ethylene carbonate (EC) or propylene carbonate (PC), and a negative electrode of carbonaceous material or lithium metal. Recently, the carbonaceous material such as coke or graphite has been paid much attention, because a negative electrode of carbonaceous material hardly forms thereon deposition of lithium metal in the form of dendrite and therefore hardly produces an electric short circuit with a positive electrode. Further, no liberation of lithium metal from the negative electrode occurs.

The non-aqueous secondary battery preferably has good battery characteristics such as large electric discharge capacity and high electric discharge retention. For instance, in a non-aqueous lithium ion secondary battery using a positive electrode of $LiCoO_2$, $LiMn_2O_4$, or $LiNiO_2$, oxidative decomposition of a portion of the non-aqueous electrolytic solution undergoes in the electric charging stage. The decomposition product disturbs electrochemical reaction so that the electric discharge capacity decreases. It is considered that the oxidative decomposition takes place in the non-aqueous solvent of the non-aqueous electrolytic solution on the interface between the positive electrode and the electrolytic solution.

Moreover, in a non-aqueous lithium ion secondary battery using negative electrode of carbonaceous material of high crystallinity such as natural graphite or artificial (or synthetic) graphite, reductive decomposition of the solvent of the non-aqueous electrolytic solution undergoes on the surface of the negative electrode in the charging stage. The reductive decomposition on the negative electrode undergoes after repeated charging-discharging procedures even in the case of using a cyclic carbonate such as ethylene carbonate (EC) and propylene carbonate (PC) which is a preferably employed solvent of the electrolytic solution.

SUMMARY OF THE INVENTION

It is an object of the present invention to provide a non-aqueous electrolytic solution which is favorably employable for the preparation of a non-aqueous lithium secondary battery, particularly a non-aqueous lithium ion secondary battery.

It is another object of the invention to provide a non-aqueous secondary battery such as a lithium ion secondary battery which has improved discharge capacity retention.

The present invention resides in a non-aqueous electrolytic solution comprising at least two organic compounds dissolved in a solvent comprising a cyclic carbonate and a chain carbonate, in an amount of 0.01 to 8 weight % (preferably, 0.1 to 4 weight %) for each organic compound, in which both of said two organic compounds have a reduction potential higher those of the cyclic and chain carbonates, and in which said one organic compound has a reduction potential equal to that of another organic compound or a reduction potential lower or higher than that of another organic compound by a potential of less than 0.4 V (preferably less than 0.2 V).

In the non-aqueous electrolytic solution of the invention, the one organic compound preferably has a reduction potential equal to that of another organic compound or a reduction potential lower or higher than that of another organic compound by a potential of less than 0.05 V.

The invention further resides in a non-aqueous secondary battery which comprises a positive electrode comprising lithium complex oxide, a negative electrode comprising graphite, a non-aqueous electrolytic solution containing an electrolyte salt in a non-aqueous solvent, and a separator, in which the non-aqueous electrolytic solution comprises at least two organic compounds dissolved in a solvent comprising a cyclic carbonate and a chain carbonate, in an amount of 0.01 to 8 weight % (preferably, 0.1 to 4 weight %) for each compound, in which both of said two organic compounds have a reduction potential higher than those of the cyclic and chain carbonates, and in which said one organic compound has a reduction potential equal to that of another organic compound or a reduction potential lower or higher than that of another organic compound by a potential of less than 0.4 V (preferably less than 0.2 V).

DETAILED DESCRIPTION OF THE INVENTION

The present invention is described below in more detail.

The present invention is characterized by incorporation of at least two organic compounds into a solvent comprising a cyclic carbonate and a chain carbonate, in an amount of 0.01 to 8 weight % (preferably, 0.1 to 4 weight %) for each compound. Both of the two organic compounds have a reduction potential higher than those of the cyclic and chain carbonates, and one organic compound has a reduction potential equal to that of another organic compound or a reduction potential lower or higher than that of another organic compound by a potential of less than 0.4 V (preferably less than 0.2 V, more preferably less than 0.05 V).

The above-mentioned two or more organic compounds are preferably selected from the group consisting of a carbonate compound, a sultone compound, a sulfonate compound, a sulfone compound, and phenyl acetylene.

Examples of the carbonate compounds include vinylene methylcarbonate, methyl propargyl carbonate, and benzaldoxime carbonate.

Examples of the sultone compounds include 1,3-propanesultone and 1,4-butanesultone.

Examples of the sulfonate compounds include 1,4-butanediol dimethane sulfonate and ethylene glycol dimethane sulfonate.

Examples of the sulfone compounds include divinyl sulfone.

The two or more organic compounds are preferably employed in such manner that one organic compound is a carbonate compound, and another organic compound is a sultone compound, a sulfonate compound, or a sulfone compound. Particularly, it is preferred that one organic compound is vinylene carbonate or methyl propargyl carbonate, and another organic compound is 1,3-propanesultone, 1,4-butanesultone, 1,4-butanediol dimethane sulfonate, or ethylene glycol dimethane sulfonate. It is also preferred that one organic compound is benzaldoxime methylcarbonate and another organic compound is divinyl-sulfone. It is also preferred that one organic compound is a sulfonate compound and another organic compound is a sultone compound. It is also preferred that one organic compound is 1,4-butanediol dimethanesulfonate or ethylene glycol dimethanesulfonate, and another organic compound is 1,3-propanesultone or 1,4-butanesultone. It is also preferred that one organic compound is phenylacetylene, and another organic compound is vinylene carbonate, 1,3-propanesultone, or 1,4-butanesultone.

It is preferred that the addition of the above-described two or more organic compounds is made to a non-aqueous solvent comprising one or more cyclic carbonates and one or more chain carbonates Examples of the cyclic carbonates include ethylene carbonate (EC), propylene carbonate (PC), and butylene carbonate (BC). Examples of the chain carbonates include dimethyl carbonate (DMC), diethyl carbonate (DEC), methyl ethyl carbonate (MEC), and methyl isopropyl carbonate (MIPC). Other known non-aqueous solvents such as tetrahydrofuran, 2-methyltetra-hydrofuran, 1,4-dioxane, 1,2-dimethoxyethane, 1,2-di-ethoxyethane, 1,2-dibutoxyethane, y-butyrolactone, aceto-nitrile, methyl propionate, and dimethylformamide may be incorporated into the mixture of the cyclic carbonate and the chain carbonate. The mixture solvent of the non-aqueous electrolytic solution preferably contains the combination of the cyclic carbonate and chain carbonate at least 60 weight %, more preferably at least 80 weight %, and most preferably at least 90 weight %. In the non-aqueous solvent mixture and in the combination of the cyclic carbonate and the chain carbonate, the cyclic carbonate preferably is in an amount of 5 to 70 volume %, and the chain carbonate preferably is in an amount of 95to 30 volume %.

In the non-aqueous electrolytic solution of the invention, the combined two or more organic compounds having a reduction potential higher than the non-aqueous solvent are considered to function in the following manner.

In the electric charging stage, the combined organic compounds having a high reduction potential decomposes on the surface of a negative electrode almost at the same time or with a short interval,.prior to the decomposition of the solvent material. The products produced by the decomposition of the organic compounds (i.e., additives) deposits on the surface of the negative electrode to cover the surface with an inactive material, which reduces decomposition of the solvent material. If the amount of the additive is larger than a certain level, however, the function of the electrolytic solution lowers.

The non-aqueous electrolytic solution preferably comprises further an electrolyte salt (particularly, inorganic electrolyte salt) such as $LiPF_6$, $LiBF_4$, $LiClO_4$, $CF_3SO_2Li$, $LiN(SO_2CF_3)_2$, $LiN(SO_2C_2F_5)_2$, $LiC(SO_2CF_3)_3$, $LiPF_4(CF_3)_2$, $LiPF_3(CF_3)_3$, $LiPF_3(C_2F_5)_3$, $LiPF_5(iso-C_3F_7)$, and $LiPF_4(iso-C_3F_7)_2$. The electrolyte salts can be employed singly or in combination. Generally, the electrolyte salt can be incorporated into the non-aqueous solvent in such an amount to give an electrolytic solution of 0.1 M to 3 M, preferably 0.5 M to 1.5.

The non-aqueous secondary battery of the invention comprises a positive electrode and a negative electrode in addition to the non-aqueous electrolytic solution.

The positive electrode generally comprises a positive electrode active material and an electro-conductive binder composition.

The positive electrode active material preferably is 35 a complex metal oxide containing at least one metal element selected from the group consisting of cobalt, manganese, nickel, chromium, iron, and vanadium and a lithium element. Examples of the complex metal oxides include $LiCoO_2$, $LiMn_2O_4$, and $LiNiO_2$.

The electro-conductive binder composition can be produced by a mixture of an electro-conductive material such as acetylene black or carbon black, a binder such as polytetrafluoroethylene (PTFE) or poly(vinylidene fluoride) (PVDF), and a solvent. For the preparation of a positive electrode, the mixture is coated on a metal plate such as aluminum foil or stainless plate, dried, and pressed for molding. The molded product is then heated in vacuo at a temperature of approx. 50 to 250° C. for approx. 2 hours, to give the desired positive electrode.

The negative electrode comprises a negative electrode active material such as a lithium metal, a lithium alloy, carbonaceous material having a graphite-type crystalline structure which can absorb and release lithium ion, or a complex tin oxide. Examples of the carbonaceous materials include thermally decomposed carbonaceous materials, cokes, graphites (e.g., artificial graphite and natural graphite), fired organic polymer materials, and carbon fibers. Preferred are carbonaceous materials having a graphite-type crystalline structure in which the lattice distance of lattice surface (002), namely, $d_{002}$, is in the range of 0.335 to 0.340 nm. The negative electrode active material in the powdery form such as carbonaceous powder is preferably used in combination with a binder such as ethylene propylene diene terpolymer (EPDM), polytetrafluoroethylene (PTFE) or poly(vinylidene fluoride) (PVDF).

There are no specific limitations with respect to the structure of the non-aqueous secondary battery of the invention. For instance, the non-aqueous secondary battery can be a battery of coin type comprising a positive electrode, a negative electrode, and single or plural separators, or a cylindrical or prismatic battery comprising a positive electrode, a negative electrode, and a separator roll. The separator can be a known microporous polyolefin film, woven fabric, or non-woven fabric.

The present invention is further described by the following non-limiting examples. [Measurement of Reduction Potential]

Ten mg of graphite powder (MCMB6-28, produced by Osaka Gas Chemical Co., Ltd.) is mixed with 10 wt. % of polyvinylidene fluoride (binder). The mixture is placed in N-methylpyrrolidone to give a slurry. The slurry is coated on a electro-collector stainless steel plate (surface area: 2 cm). Thus coated plate is set as a working electrode to form a triode cell in combination with counter and reference electrodes using lithium metal.

A non-aqueous solvent is prepared from ethylene carbonate and methyl ethyl carbonate at a volume ratio of 3.7. To the solvent is added $LiPF_6$ (electrolyte, to give 1 M concentration) to produce an electrolytic solution. To the resulting electrolytic solution is added an organic compound (i.e., additive) to be measured, in an amount of 2 wt. %.

The triode cell is placed in the additive-containing electrolytic solution, and the reduction potential is measured at room temperature under a potential scanning rate of 1 mV/sec. A potential in terms of V at which a current of 0.5 mA flows is assigned to the reduction potential.

The reduction potentials measured on various organic compounds are set forth in Table 1.

TABLE 1

| Organic Compound (Additive) | Abbr. | Reduction Potential (vs. Lithium metal) |
|---|---|---|
| Vinylene carbonate | VC | 0.81 V |
| 1,3-Propanesultone | PS | 0.83 V |
| 1,4-Butanesultone | BS | 0.80 V |
| 1,4-Butanediol dimethane sulfonate | BDDMS | 0.81 V |
| Ethylene glycol Dimethane sulfonate | BGDMS | 0.81 V |
| Methyl propargyl carbonate | MPGC | 0.82 V |
| Phenylacetylene | PA | 0.81 V |
| Benzaldoxime methylcarbonate | BAOMC | 1.78 V |
| Divinylsulfone | VS | 1.45 V |

EXAMPLE 1

1) Preparation of non-aqueous electrolytic solution

In a non-aqueous mixture of propylene carbonate and dimethyl carbonate [PC:DMC=1:2, volume ratio] was dissolved $LiPF_6$ to give a non-aqueous electrolytic solution of 1 M concentration. To the electrolytic solution were added vinylene carbonate (VC) and 1,3-propanesultone (PS), both in an amount of 1.5 wt. % (based on the amount of the electrolytic solution).

2) Preparation of lithium secondary battery and measurement of its battery characteristics. $LiCoO_2$ (positive electrode active material, 80 wt. %), acetylene black (electro-conductive material, 10 wt. %), and poly(vinylidene fluoride) (binder, 10 wt. %) were mixed. To the resulting mixture was further added N-methylpyrrolidone (solvent). Thus produced positive electrode mixture was coated on aluminum foil, dried, molded under pressure, and heated to give a positive electrode.

Natural graphite (negative electrode active material, 90 wt. %) and poly(vinylidene fluoride) (binder, 10 wt. %) were mixed. To the resulting mixture was further added N-methylpyrrolidone (solvent). Thus produced negative electrode mixture was coated on copper foil, dried, molded under pressure, and heated to give a negative electrode.

The positive and negative electrodes, a microporous polypropylene film separator, and the non-aqueous electrolytic solution were combined to give a coin-type battery (diameter: 20 mm, thickness: 3.2 mm).

The coin-type battery was charged at room temperature (20° C.) with a constant electric current (0.8 mA) to reach 4.2 V, and then the charging was continued under a constant voltage of 4.2 V for a period of 6 hours. Subsequently, the battery was discharged to give a constant electric current (0.8 mA). The discharge was continued to give a terminal voltage of 2.7V. The charge-discharge cycle was repeated 50 times.

The initial discharge capacity was as much as 0.97 which was calculated on the basis that the initial discharge capacity measured in Comparison Example 6 (using a solvent mixture consisting of ethylene carbonate, propylene carbonate and diethyl carbonate, 3/1/6, volume ratio) was set to 1.

After the 50 cycle charge-discharge procedure, the discharge capacity was 94.86 of the initial discharge capacity. No deformation was observed on the battery appearance. The low temperature characteristics were satisfactory.

The preparation and evaluation of the battery are summarized in Table 2.

COMPARISON EXAMPLE 1

The procedures of Example 1 were repeated except that neither VC nor PS were incorporated into the electrolytic solution.

In performing-the charging procedure using the secondary battery, propylene carbonate (PC) decomposed at the first charging procedure, and no discharge was done. The battery was deformed. The battery was then disjointed to examine its interior. The graphite negative electrode showed exfoliation on its surface.

The preparation and evaluation of the battery are summarized in Table 2.

COMPARISON EXAMPLES 2 to 5

The procedures of Example 1 were repeated except that only one of VC and PS was incorporated into the electrolytic solution.

The preparation and evaluation of the battery are summarized in Table 2.

TABLE 2

(Solvent: PC/DMC = 1/2)

| Example | Additive(s) (%) | Initial discharge capacity (relative value) | Discharge capacity retention |
|---|---|---|---|
| Example 1 | VC(1.5)/PS(1.5) | 0.97 | 94.8% |
| Com. Ex. 1 | None | 0 | — |
| Com. Ex. 2 | VC(1.5) | 0.93 | 83.2% |
| Com. Ex. 3 | VC(3.0) | 0.95 | 84.8% |
| Com. Ex. 4 | PS(1.5) | 0.95 | 82.7% |
| Com. Ex. 5 | PS(3.0) | 0.96 | 84.3% |

EXAMPLES 2 & 3

The procedures of Example 1 were repeated except that the solvent was replaced with EC/DEC (1/2) (for Example 2), and that the solvent was replaced with EC/MEC (1/2) and the negative electrode was made from artificial graphite (for Example 3).

The preparation and evaluation of the battery are summarized in Table 3.

TABLE 3

(Additive: VC(1.5%)/PS(1.5%))

| Example | Solvent (graphite) | Initial discharge capacity (relative value) | Discharge capacity retention |
|---|---|---|---|
| Example 2 | EC/DEC = 1/2 (natural) | 1.02 | 95.3% |
| Example 3 | EC/MEC = 1/2 (artificial) | 1.03 | 94.7% |

EXAMPLES 4 to 7

The procedures of Example 1 were repeated except that the solvent was replaced with EC/PC/DEC (1/1/2) and that the amount of the added organic compounds were changed.

The preparation and evaluation of the battery are summarized in Table 4.

TABLE 4

(Solvent: BC/PC/DEC = 1/1/2)

| Example | Additives | Initial discharge capacity (relative value) | Discharge capacity retention |
|---|---|---|---|
| Example 4 | VC(0.5)/PS(1.5) | 1.01 | 93.5% |
| Example 5 | VC(3.0)/PS(1.5) | 0.98 | 93.8% |
| Example 6 | VC(1.5)/PS(0.5) | 1.00 | 93.1% |
| Example 7 | VC(1.5)/PS(3.0) | 0.99 | 93.6% |

EXAMPLES 8 AND COMPARISON EXAMPLES 6 to 9

The procedures of Example 1 were repeated except that the solvent was replaced with EC/PC/DEC (3/1/6) and that the natural graphite for the negative electrode was replaced with artificial graphite.

The incorporation of the additives was examined under various conditions.

The preparation and evaluation of the battery are summarized in Table 5.

TABLE 5

(Solvent: EC/PC/DEC = 3/1/6, Negative electrode: artificial graphite)

| Example | Additives | Initial discharge capacity (relative value) | Discharge capacity retention |
|---|---|---|---|
| Example 8 | VC(1.5)/PS(1.5) | 1.02 | 95.5% |
| Com. Ex. 6 | None | 1.00 | 81.6% |
| Com. Ex. 7 | VC(1.5) | 0.97 | 83.8% |
| Com. Ex. 8 | PS(1.5) | 1.00 | 84.2% |
| Com. Ex. 9 | VC(10.0)/PS(10.0) | 0.93 | 80.6% |

EXAMPLE 9

The procedures of Example 1 were repeated except that the solvent was replaced with EC/PC/MEC (3/1/6) and that the natural graphite for the negative electrode was replaced with artificial graphite.

Each of the additives of VC and PS were incorporated in an amount of 2.0 wt. %.

The preparation and evaluation of the battery are summarized in Table 6.

TABLE 6

(Solvent: EC/PC/MEC = 3/1/6, Negative electrode: artificial graphite)

| Example | Additives | Initial discharge capacity (relative value) | Discharge capacity retention |
|---|---|---|---|
| Example 9 | VC(2.0)/PS(2.0) | 1.03 | 94.1% |

EXAMPLE 10

The procedures of Example 1 were repeated except that the solvent was replaced with EC/PC/DMC/MIPC (3/1/3/3) and that the natural graphite for the negative electrode was replaced with artificial graphite.

The preparation and evaluation of the battery are summarized in Table 7.

TABLE 7

(Solvent: EC/PC/DMC/MIPC (3/1/3/3), Negative electrode: artificial graphite)

| Example | Additives | Initial discharge capacity (relative value) | Discharge capacity retention |
|---|---|---|---|
| Example 10 | VC(1.5)/PS(1.5) | 1.01 | 93.4% |

EXAMPLES 11 & 12 AND COMPARISON EXAMPLE 10

The procedures of Example 1 were repeated except that the solvent was replaced with EC/PC/DMC/DEC (3/1/3/3), that $LiCoO_2$ (positive electrode active material) was replaced with $LiMn_2O_4$, and that the natural graphite for the negative electrode was replaced with artificial graphite.

The incorporation of the additive(s) was examined under various conditions.

The preparation and evaluation of the battery are summarized in Table 8.

TABLE 8

(Solvent: EC/PC/DMC/DEC (3/1/3/3), Positive electrode: $LiMn_2O_4$, Negative electrode: artificial graphite)

| Example | Additives | Initial discharge capacity (relative value) | Discharge capacity retention |
|---|---|---|---|
| Example 11 | VC(1.5)/PS(1.5) | 1.05 | 95.5% |
| Example 12 | VC(1.5)/BS(1.5) | 1.05 | 95.3% |
| Com. Ex. 10 | BS(1.5) | 1.00 | 83.4% |

EXAMPLES 13 to 19 AND COMPARISON EXAMPLES 11 to 14

The procedures of Example 1 were repeated except that the solvent was replaced with EC/PC/DEC (3/1/6) and that the natural graphite for the negative electrode was replaced with artificial graphite.

The incorporation of the additive(s) was examined under various conditions.

The preparation and evaluation of the battery are summarized in Table 9.

TABLE 9

(Solvent: EC/PC/DEC (3/1/6), Negative electrode: artificial graphite)

| Example | Additives | Initial discharge capacity (relative value) | Discharge capacity retention |
|---|---|---|---|
| Example 13 | VC(1.5)/PS(1.0)/BS(0.5) | 1.03 | 95.8% |
| Example 14 | VC(1.5)/BDDMS(1.5) | 1.02 | 94.2% |
| Example 15 | VC(1.5)/EGDMS(1.5) | 1.01 | 93.7% |
| Example 16 | VC(1.5)/BDDMS(1.0)/EGDMS(0.5) | 1.02 | 94.9% |
| Example 17 | PS(1.5)/BDDMS(1.5) | 1.00 | 93.9% |
| Example 18 | PS(1.5)/EGDMS(1.5) | 1.00 | 93.3% |
| Example 19 | PS(1.5)/BDDMS(1.0)/EGDMS(0.5) | 1.01 | 94.5% |
| Com. Ex. 11 | BDDMS(1.5) | 1.01 | 82.9% |

TABLE 9-continued (Solvent: EC/PC/DEC (3/1/6),
Negative electrode: artificial graphite)

| Example | Additives | Initial discharge capacity (relative value) | Discharge capacity retention |
|---|---|---|---|
| Com. Ex. 12 | EGDMS(1.5) | 1.01 | 82.3% |
| Com. Ex. 13 | BDDMS(3.0) | 1.01 | 83.9% |
| Com. Ex. 14 | EGDMS(3.0) | 1.01 | 83.1% |

EXAMPLES 20 to 25 AND COMPARISON EXAMPLES 15 to 18

The procedures of Example 1 were repeated except that the solvent was replaced with EC/PC/DEC (3/1/6) and that the natural graphite for the negative electrode was replaced with artificial graphite.

The incorporation of the additive(s) was examined under various conditions.

The preparation and evaluation of the battery are summarized in Table 10.

TABLE 10

(Solvent: EC/PC/DEC (3/1/6),
Negative electrode: artificial graphite)

| Example | Additives | Initial discharge capacity (relative value) | Discharge capacity retention |
|---|---|---|---|
| Example 20 | VC(1.5)/MPGC(1.5) | 1.00 | 92.3% |
| Example 21 | VC(1.5)/PA(1.5) | 1.00 | 91.5% |
| Example 22 | VC(1.5)/MPGC(0.5)/PA(1.0) | 1.01 | 92.9% |
| Example 23 | PS(1.5)/MPGC(1.5) | 1.01 | 92.0% |
| Example 24 | PS(1.5)/PA(1.5) | 1.01 | 90.9% |
| Example 25 | PS(1.5)/MPGC(0.5)/PA(1.0) | 1.02 | 92.5% |
| Com. Ex. 15 | MPGC(1.5) | 1.00 | 82.0% |
| Com. Ex. 16 | PA(1.5) | 1.00 | 81.9% |
| Com. Ex. 17 | MPGC(3.0) | 1.00 | 83.2% |
| Com. Ex. 18 | PA(3.0) | 1.00 | 82.9% |

EXAMPLES 26 to 28 AND COMPARISON EXAMPLES 19 to 25

The procedures of Example 1 were repeated except that the solvent was replaced with EC/PC/DEC (3/1/6) and that the natural graphite for the negative electrode was replaced with artificial graphite.

The incorporation of the additive(s) was examined under various conditions.

The preparation and evaluation of the battery are summarized in Table 11.

TABLE 11

(Solvent: EC/PC/DEC (3/1/6),
Negative electrode: artificial graphite)

| Example | Additives | Initial discharge capacity (relative value) | Discharge capacity retention |
|---|---|---|---|
| Example 26 | VS(0.15)/BAOMC(2.0) | 1.01 | 93.8% |
| Example 27 | VS(0.2)/BAOMC(1.5) | 1.00 | 94.0% |
| Example 28 | VS(0.3)/BAOMC(1.5) | 1.00 | 92.5% |
| Com. Ex. 19 | VS(0.2) | 1.00 | 83.5% |
| Com. Ex. 20 | BAOMC(1.5) | 1.00 | 83.2% |
| Com. Ex. 21 | VS(1.7) | 0.77 | 74.7% |
| Com. Ex. 22 | BAOMC(1.7) | 0.99 | 85.1% |
| Com. Ex. 23 | VS(10.0)/BAOMC(10.0) | 0.66 | 63.4% |
| Com. Ex. 24 | BDDMS(1.5)/BAOMC(1.5) | 1.00 | 83.2% |
| Com. Ex. 25 | PA(1.5)/VS(0.2) | 1.00 | 83.5% |

What is claimed is:

1. A non-aqueous electrolytic solution comprising at least two organic compounds dissolved in a solvent comprising a cyclic carbonate and a chain carbonate, in an amount of 0.1 to 4 weight % for each compound,
   in which both of said two organic compounds have a reduction potential higher than reduction potentials of the cyclic and chain carbonates,
   in which one of the organic compounds has a reduction potential equal to a reduction potential of another organic compound or has a reduction potential lower or higher than a reduction potential of another organic compound by a potential of less than 0.4 V, and
   in which the former organic compound is vinylene carbonate and the latter organic compound is selected from the group consisting of a sultone compound, a sulfonate compound, phenylacetylene, and methyl propargyl carbonate.

2. The non-aqueous electrolytic solution of claim 1, in which the latter organic compound is 1,3-propanesultone or 1,4-butanesultone.

3. The non-aqueous electrolytic solution of claim 1, in which the cyclic carbonate is selected from the group consisting of ethylene carbonate, propylene carbonate, and butylene carbonate, and the chain carbonate is selected from the group consisting of dietthyl carbonate, diethyl carbonate, methyl ethyl carbonate, and methyl isopropyl carbonate.

4. A non-aqueous electrolytic solution comprising at least two organic compounds dissolved in a solvent comprising a cyclic carbonate and a chain carbonate, in an amount of 0.1 to 4 weight % for each compound,
   in which both of said two organic compounds have a reduction potential higher than reduction potentials of the cyclic and chain carbonates,
   in which one of the organic compounds has a reduction potential equal to a reduction potential of another organic compound or has a reduction potential lower or higher than a reduction potential of another organic compound by a potential of less than 0.4 V, and
   in which the former organic compound is 1,3-propanesultone or 1,4-butanesultone and the latter organic compound is selected from the group consisting of 1,4 butanediol dimethane sulfonate, ethylene glycol dimethane sulfonate, methyl propargyl carbonate, and phenylacetylene.

5. The non-aqueous electrolytic solution of claim 4, in which the former organic compound is 1,3-propanesultone.

6. The non-aqueous electrolytic solution of claim 4, in which the cyclic carbonate is selected from the group consisting of ethylene carbonate, propylene carbonate, and butylene carbonate, and the chain carbonate is selected from the group consisting of dimethyl carbonate, diethyl carbonate, methyl ethyl carbonate, and methyl isopropyl carbonate.

7. A non-aqueous electrolytic solution comprising at least two organic compounds dissolved in a solvent comprising a cyclic carbonate and a chain carbonate, and an amount of 0.1 to 4 weight % for each compound, in which both of said two organic compounds have a reduction potential higher than reduction potentials of the cyclic and chain carbonates, in which one of the organic compounds has a reduction potential equal to a reduction potential of another organic compound or has a reduction potential lower or higher than a reduction potential of another organic compound by a potential of less than 0.4 V, and in which the former organic compound is divinylsulfone and the latter organic compound is benzaldoxime methylcarbonate.

8. The non-aqueous electrolytic solution of claim 7, in which the cyclic carbonate is selected from the group consisting of ethylene carbonate, propylene carbonate, and butylene carbonate, and the chain carbonate is selected from the group consisting of diethyl carbonate, diethyl carbonate, methyl ethyl carbonate, and methyl isopropyl carbonate.

9. A non-aqueous lithium secondary battery which comprises a positive electrode comprising lithium complex oxide, a negative electrode comprising graphite, a non-aqueous electrolytic solution containing an electrolyte salt in a non-aqueous solvent, and a separator, in which the non-aqueous electrolytic solution comprises at least two organic compounds dissolved in a solvent comprising a cyclic carbonate and a chain carbonate, in an amount of 0.1 to 4 weight % for each compound, in which both of said two organic compounds have a reduction potential higher than reduction potentials of the cyclic and chain carbonates, in which one of the organic compounds has a reduction potential equal to a reduction potential of another organic compound or has a reduction potential lower or higher than a reduction potential of another organic compound by a potential of less than 0.4 V, and in which the former organic compound is vinylene carbonate and the latter organic compound is selected from the group consisting of a sultone compound, a sulfonate compound, phenylacetylene, and methyl propargyl carbonate.

10. The non-aqueous lithium secondary battery of claim 9, in which the latter organic compound is 1,3-propanesultone or 1,4-butanesultone.

11. A non-aqueous lithium secondary battery which comprises a positive electrode comprising lithium complex oxide, a negative electrode comprising graphite, a non-aqueous electrolytic solution containing an electrolyte salt in a non-aqueous solvent, and a separator, in which the non-aqueous electrolytic solution comprises at least two organic compounds dissolved in a solvent comprising a cyclic carbonate and a chain carbonate, in an amount of 0.1 to 4 weight % for each compound, in which both of said two organic compounds have a reduction potential higher than reduction potentials of the cyclic and chain carbonates, in which one of the organic compounds has a reduction potential equal to a reduction potential of another organic compound or has a reduction potential lower or higher than a reduction potential of another organic compound by a potential of less than 0.4 V, and in which the former organic compound is 1,3-propanesultone or 1,4-butanesultone and the latter organic compound is selected from the group consisting of 1,4-butanediol dimethane sulfonate, ethylene glycol dimethane sulfonate, methyl propargyl carbonate, and phenylacetylene.

12. The non-aqueous lithium secondary battery of claim 11, in which the former organic compound is 1,3-propanesultone.

13. A non-aqueous lithium secondary battery which comprises a positive electrode comprising lithium complex oxide, a negative electrode comprising graphite, a non-aqueous electrolytic solution containing an electrolyte salt in a non-aqueous solvent, and a separator, in which the non-aqueous electrolytic solution comprises at least two organic compounds dissolved in a solvent comprising a cyclic carbonate and a chain carbonate, in an amount of 0.1 to 4 weight % for each compound, in which both of said two organic compounds have a reduction potential higher than reduction potentials of the cyclic and chain carbonates, in which one of the organic compounds has a reduction potential equal to a reduction potential of another organic compound or has a reduction potential lower or higher than a reduction potential of another organic compound by a potential of less than 0.4 V, and in which the former organic compound is divinylsulfone and the latter organic compound is benzaldoxime methylcarbonate.

* * * * *